UNITED STATES PATENT OFFICE.

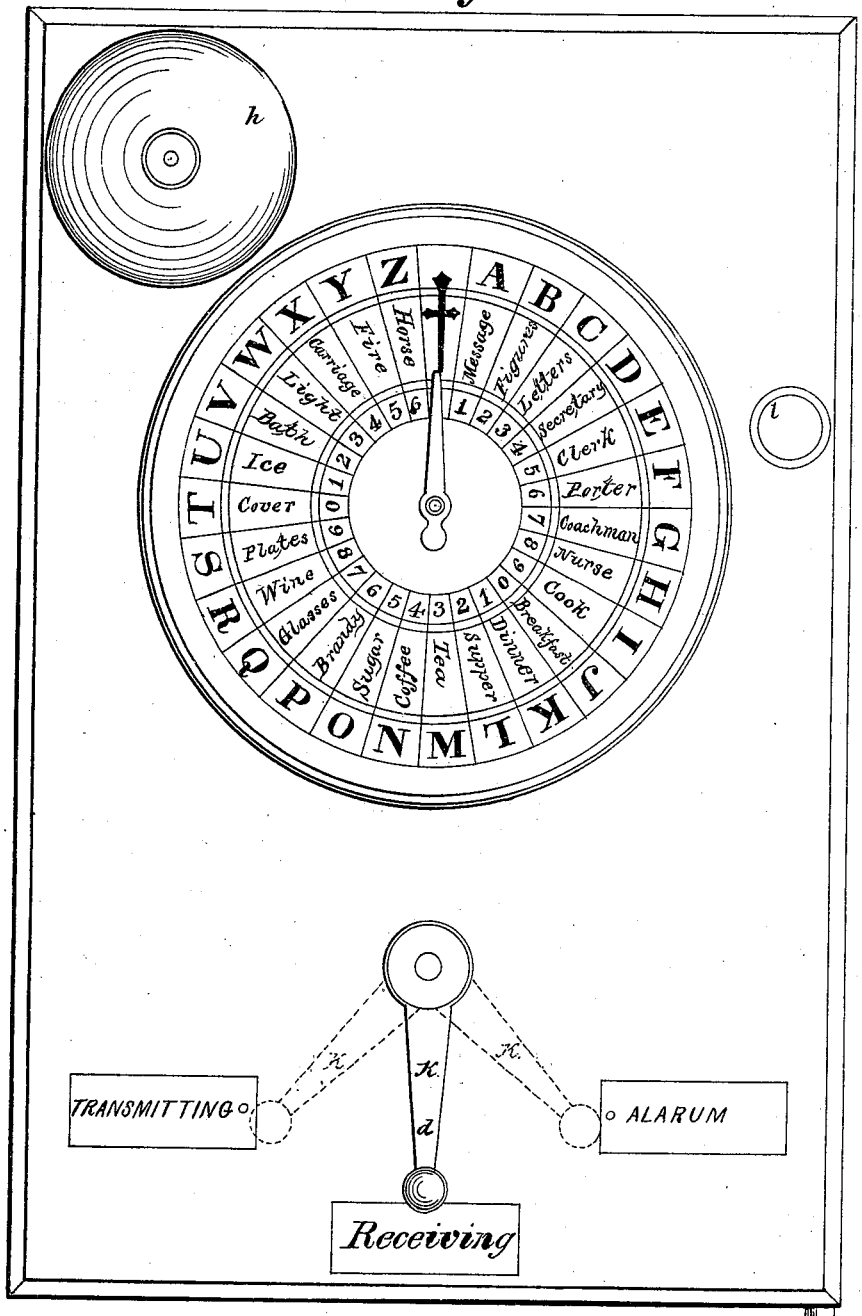

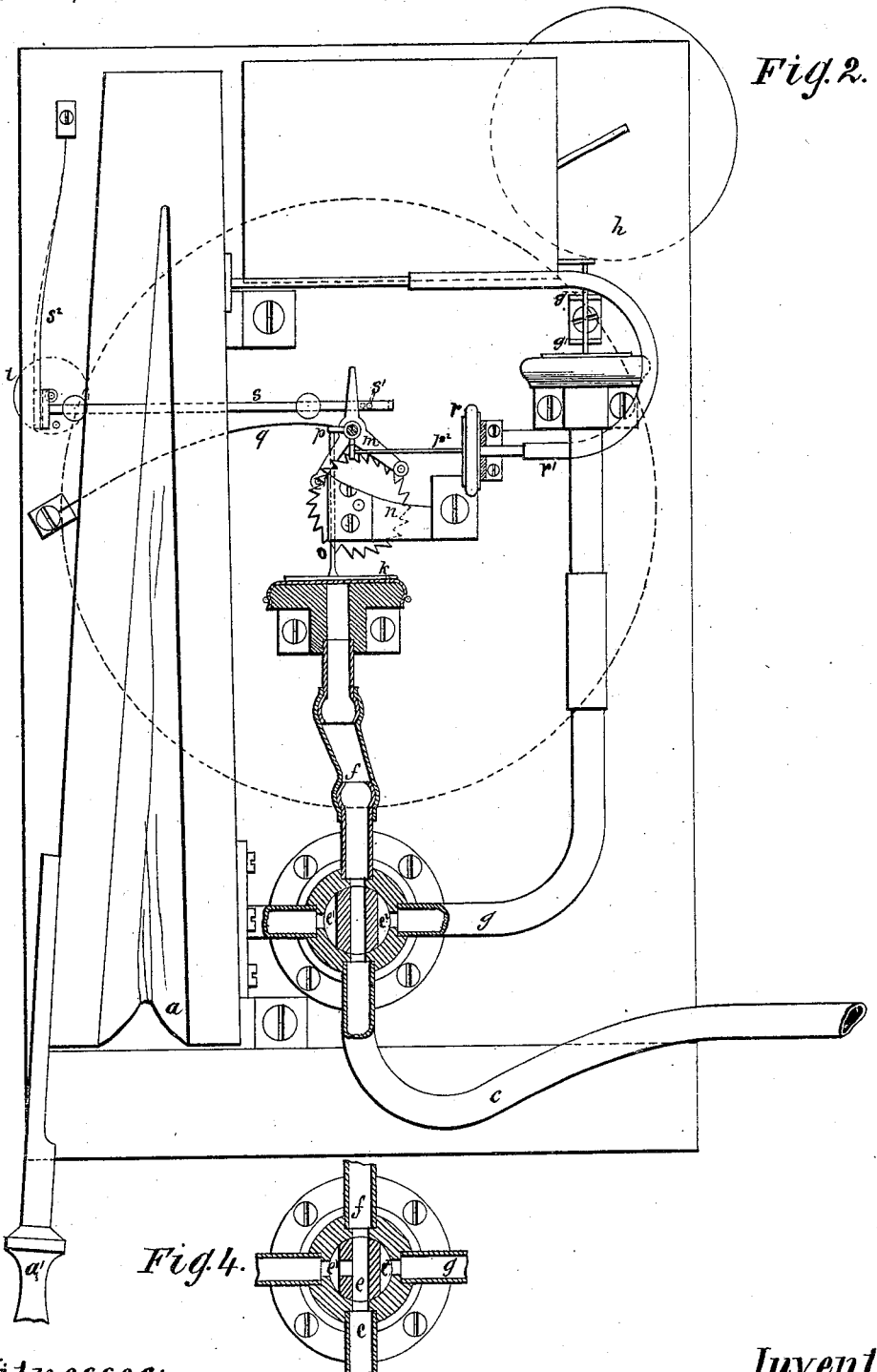

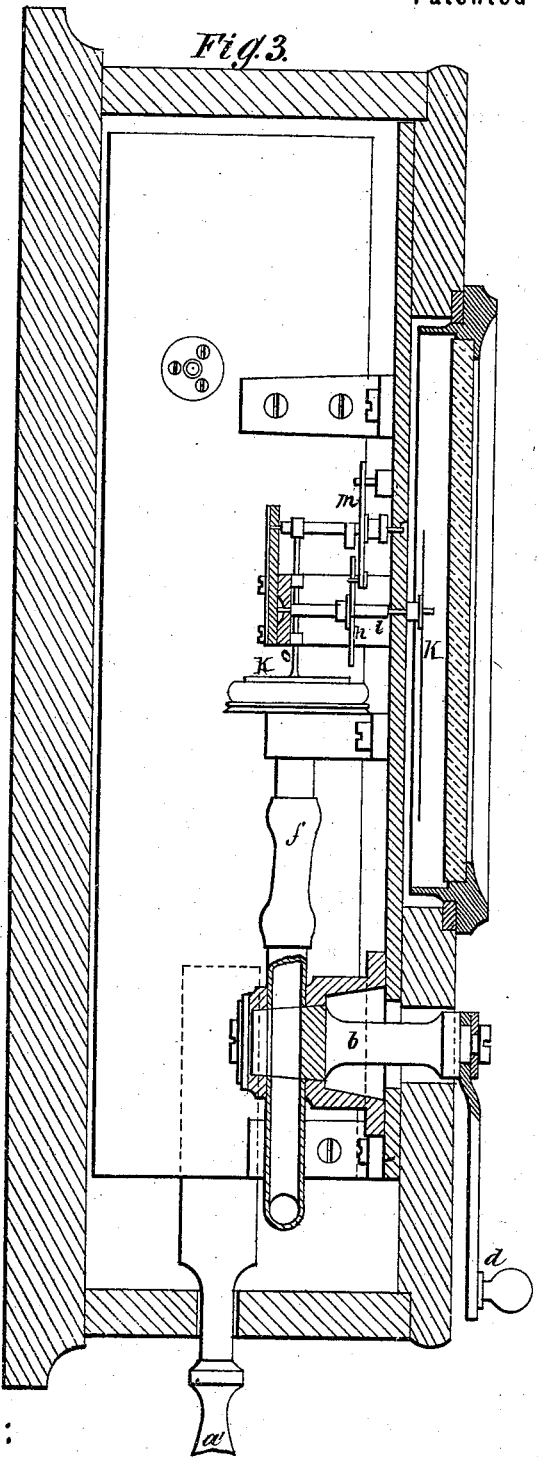

AUGUSTO GUATTARI, OF CASTELLAMARE, ITALY.

IMPROVEMENT IN PNEUMATIC TELEGRAPHS.

Specification forming part of Letters Patent No. 148,362, dated March 10, 1874; application filed December 26, 1873.

*To all whom it may concern:*

Be it known that I, AUGUSTO GUATTARI, of Castellamare, in the Kingdom of Italy, have invented a new and useful Improvement in Pneumatic Telegraphs; and I do hereby declare that the following is a full, clear, and exact description of the same, reference being had to the accompanying drawings forming a part of this specification.

My invention relates to pneumatic telegraphs; and consists of an improved instrument adapted to serve either as transmitter or receiver, so that by means of two such instruments placed at different stations and connected by a single air-conducting tube messages may be transmitted in either direction. This instrument has but one dial, which serves to indicate both the signals sent and received, so that the same instrument is made to answer both purposes, thereby dispensing with one of the instruments required in all other pneumatic telegraphs, enabling me to greatly lessen the cost of the apparatus.

The instrument comprises a compressible air-bag, $a$, worked by handle $a'$, and communicating, when the instrument is used as a transmitter, by one of several ways or passages in a cock, $b$, with the air-tube $c$, leading to a precisely similar instrument placed in any situation with which it is desired to communicate. The cock $b$ has three ways, $e$ $e^1$ $e^2$, and a handle, $d$, by which it may be set in any one of the three positions indicated in Fig. 1, for the purpose, first, (when the instrument is to be used for transmitting,) of establishing communication by side passage $e^1$ between bellows $a$ and the tube $c$; or, second, (when the instrument is used for receiving,) for connecting, by another passage, $e$, tube $c$ with branch tube $f$, leading to the mechanism by which the index-needle is operated; or, thirdly, for connecting, by means of the passage $e^2$, tube $c$ with the branch tube $g$, which leads to the alarm $h$. In this latter position, also, the passage $e^1$ connects bellows $a$ with tube $f$, to enable the operator to bring the needle of the instrument to the + or starting-point on the dial before commencing to receive or to send a message. The passages $e$ $e^1$ $e^2$ are so arranged and the spaces between the tubes $e f g$ are so proportioned thereto that when handle $d$ is in either of the extreme positions the center passage $e$ will not be open to any one of the tubes. The several positions of the cock are indicated in Fig. 1, and to adapt the instrument to send or receive messages or signals it is simply necessary to move the handle $d$ to adjust cock $b$ accordingly. The branch tube $f$ terminates in an enlargement or head, as shown, over which is stretched a thin membrane or diaphragm, $k$, of india-rubber, by which the end of the tube is closed air-tight. This membrane is inflated each time the air in the tube is compressed. $i$ is the dial, marked with suitable letters, words, and signs, as shown; and $k'$ is the index-needle working over the same. This needle is fixed on a spindle, $l$, and is rotated step by step over the dial by an anchor propelment, $m$, working a ratchet-wheel, $n$, keyed on spindle $l$, and operated by the movements of diaphragm $k$, which are transmitted by means of a rod, $o$, terminating at one end in a disk bearing against the said diaphragm, and abutting at the other end against a projection, $p$, on the anchor $m$. The inflation of the diaphragm $k$ oscillates the anchor $m$ in one direction, the return movement being effected by a spring, $q$. In order that the needle of the instrument, when transmitting a message, may work in unison with the needle of the instrument at the other end of the tube $c$, at which the message is being received, I provide another diaphragm, $s$, similar to $k$, which closes the end of a small tube, $r^1$, leading from bellows $a$, and inflated at each compression of the said bellows, thus actuating the anchor propelment through the agency of a rod, $r^2$, acting on a small arm on the anchor-spindle. The branch tube $g$ is also closed by a diaphragm, $g^1$, like the others, and, when inflated by the pressure of air in the tube, acts on a rod, $g^2$, which releases a detent, controlling any suitable arrangement of alarm. $s$ is a rod, fitted to slide in guides and provided with a stud, $s^1$, which abuts against a tail-piece on the anchor $m$, and holds the latter stationary when the rod $s$ is forced back against the pressure of its springs $s^2$ by depressing a knob, $t$, fixed on a pin terminating in a beveled point bearing against a head or rod, $s$. This is done when the operator desires to sound the bell of the instrument at the distant station without moving the needle of his own instrument.

The instruments are worked in the following manner: Suppose two instruments to be placed at any convenient distance apart and connected by a tube, c, as above described. When not signaling, the handle d is kept over the word "alarum," so that the branch g of each instrument is in communication with the tube c by passage $e^2$, and either operator can attract the attention of the other. To do this he moves the handle d to the word "transmitting," thereby establishing communication between the air-bag a and tube c. He then depresses knob t, and compresses the said bag a, which inflates the diaphragm $g^1$ of the other instrument, thereby releasing the clock-work and sounding the alarum. The latter is so arranged as to cease sounding as soon as the diaphragm again collapses. The operator whose attention is thus called immediately places the handle d of his instrument over the word "receiving," thus connecting branch f with tube c, in which position the instrument is adapted for receiving signals.

In order to replace the needle of his own instrument at the + or starting point on the dial before sending or receiving a message, the operator places handle d over the word "alarum," and actuates the needle by working the bellows a. In order to transmit signals, the handle d is placed in the proper position, as indicated, and the bellows a worked, as before, the pulsations of the air thus produced actuating the needles of both instruments in unison, as before described.

Although I prefer the arrangement above described, I may dispense with the diaphragm r and small tube $r^1$, and make a communication between passages $e^1$ and e of cock b, to produce the same result; or I may cause the moving part of bellows a to act directly on anchor m through the agency of rod s, which would be connected to the bellows by a spring to allow the bellows to be worked without moving the rod s, when desired. The tension of said spring would be counteracted by another spring applied against the other end of rod s, so as to allow the latter to be moved freely to and fro at every motion of handle $a'$. The stud $s'$ would in this case be placed so as to push against the tail-piece of anchor m; but it could be prevented from acting thereon when not required by holding back rod s and depressing knob t.

Valves may be substituted for the diaphragm above referred to by employing bellows capable of forcing currents of air through the tubes, instead of merely compressing it therein, and for long distances the needle may be operated by clock-work mechanism fitted in the instrument itself, and released by the movements of the diaphragm or valve, instead of the latter being made to actuate the needle directly, as hereinbefore described.

Having thus described my invention, what I claim is—

1. A combined receiving and transmitting instrument, consisting of an air-compressing apparatus, a dial with index-needle actuated by propelling mechanism, and a cock by which any one of the branch tubes may be made to communicate with the main tubes, all substantially as herein described.

2. The combination, with a clock-mechanism anchor, m, having the stud p, of the spring q, rod o, and vibratory diaphragm k, to operate a needle on the dial of clock mechanism, as and for the purpose described.

3. The combination of bellows a, tube $r^1$, diaphragm h, and rod $r^2$ with an arm of anchor-shaft, as and for the purpose specified.

The above specification of my invention signed by me this 6th day of November, 1873.

AUGUSTO GUATTARI.

Witnesses:
HERMANN KREISMANN,
BERTHOLD ROI.